US008595360B2

(12) United States Patent
Hill et al.

(10) Patent No.: US 8,595,360 B2
(45) Date of Patent: Nov. 26, 2013

(54) METHOD, SYSTEM AND APPARATUS FOR DISTRIBUTING DIGITAL INFORMATION INCLUDING DIGITAL RIGHTS MANAGEMENT INFORMATION TO A PLURALITY OF DEVICES

(75) Inventors: Thomas C. Hill, Crystal Lake, IL (US); Sandeep M. Adwankar, Buffalo Grove, IL (US); Vijay Anand, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 795 days.

(21) Appl. No.: 11/557,367

(22) Filed: Nov. 7, 2006

(65) Prior Publication Data

US 2008/0109360 A1    May 8, 2008

(51) Int. Cl.
*G06F 15/173* (2006.01)
(52) U.S. Cl.
USPC .......................................................... 709/226
(58) Field of Classification Search
USPC ......... 709/226, 203, 209, 219, 225, 231, 232;
725/151; 714/805, 49; 341/120, 153,
341/144, 143, 155; 369/47.12, 85, 47.17
See application file for complete search history.

(56) References Cited

U.S. PATENT DOCUMENTS

| | | | |
|---|---|---|---|
| 5,618,045 A | 4/1997 | Kagan et al. | |
| 2002/0152467 A1* | 10/2002 | Fiallos | 725/50 |
| 2003/0069749 A1 | 4/2003 | Shear et al. | |
| 2003/0174838 A1* | 9/2003 | Bremer | 380/270 |
| 2006/0130037 A1* | 6/2006 | Mackay | 717/168 |
| 2006/0165040 A1 | 7/2006 | Rathod et al. | |
| 2006/0179489 A1* | 8/2006 | Mas Ribes | 726/27 |
| 2006/0200814 A1* | 9/2006 | Kontinen et al. | 717/168 |
| 2007/0050590 A1* | 3/2007 | Syed et al. | 711/170 |
| 2008/0031148 A1* | 2/2008 | Sagy | 370/252 |

OTHER PUBLICATIONS

Cesar, P.S. et al. 'An Architecture for End-user TV Content Enrichment'. In Journal of Virtual Reality and Broadcasting, vol. 3, No. 9. Published Jun. 2006. http://www.jvrb.org/3.2006/euroitv2006/759/euroitv01.pdf.

PCT International Search Report and Written Opinion. Issued by International Searching Authority. Dated Jun. 11, 2008.

Kwok, et al: "A License Management Model to Support B2C and C2C Music Sharing", Department of Information and Systems Management; Hong Kong University of Science and Technology.

* cited by examiner

*Primary Examiner* — Barbara Burgess

(57) ABSTRACT

A system (10) and method (50) for distributing digital information, including download information and activation or digital rights management information, to one or more branch devices. The method includes a root device receiving digital information from an information source, and transmitting the download information and the activation information associated with the download information to one or more branch devices. The branch device, upon receiving the activation information can activate, install or execute the download information. The download information and/or the activation information can be conditionally distributed, e.g., based on a time-based, location-based or authentication-based condition or event. The method also may include extracting the distributed information, e.g., upon the completion of the condition or event. The root device and/or the branch device includes a controller configured to transmit and/or receive the digital information, via a transceiver, and configured to use the activation information to install or execute the download information.

17 Claims, 2 Drawing Sheets

METHOD, SYSTEM AND APPARATUS FOR DISTRIBUTING DIGITAL INFORMATION INCLUDING DIGITAL RIGHTS MANAGEMENT INFORMATION TO A PLURALITY OF DEVICES

BACKGROUND OF THE INVENTION

1. Field of the Invention

The invention relates to distributing digital information components including digital rights management information to a plurality of devices. More particularly, the invention relates to the managed, peer-to-peer distribution of digital information components including digital rights management information to a plurality of devices.

2. Description of the Related Art

The distribution of digital information, including digital rights management (DRM) of the distributed information, typically is based on relatively centralized owner-to-consumer or vendor-to-consumer distribution models. For example, the distribution of digital information, such as software upgrades or new features or user interfaces for cellular phones and smart phones, personal digital assistants (PDAs), music players and other devices, conventionally occurs through the use of a centralized access point, such as a content server, e.g., a website. Alternatively, the distribution of such digital information can occur through one or a few relatively centralized vendors or vendor brokers. For example, users can obtain digital upgrades or new features from a vendor store or wirelessly via a vendor operator that controls distribution of the information. The distribution of the digital information typically includes the owner or vendor also transferring digital rights management information.

Digital rights management (DRM) generally refers to systems and technologies used to control access to and distribution of digital information, such as digital content. Digital rights management information generally includes three components: expression, authentication and protection. Expression typically involves the description of the resources, the ownership of the resources, and the terms and conditions of use of the resources. Authentication typically involves some form of verification that a user of the resources has the right to use the resources. Protection typically involves the means, such as encryption and digital keys, to ensure that only authorized users have access to the resources. Existing digital rights management technology includes Janus for portable devices using Windows Media, Fairplay for use with iPod and iTunes, and any digital rights management technology in accordance with the Open Mobile Alliance (OMA) standard.

The conventional use of relatively centralized system architectures to distribute digital information can be unduly costly and burdensome to centralized servers and their operators, e.g., if software upgrades or other digital information need to be distributed to a relatively large number of users within a given period of time. Moreover, many of the conventional centralized distribution systems often lack end-user customization. For example, owners or vendors typically offer only a few select upgrade or feature packages for wireless device end users. End users often are required to accept all features within a given upgrade package or not receive the upgrade at all.

One conventional alternative to the central server system for distribution of digital information is a peer-to-peer (P2P) network or system for transferring or distributing digital information. Rather than concentrating information in a relatively few number of centralized server locations, P2P networks use a plurality of peer or client nodes that can serve both as servers and clients to other peer nodes within an ad-hoc network, such as an ad-hoc wireless local area network (LAN) or personal area network (PAN).

P2P networks and systems exist that transfer and share digital information, such as media content (audio and/or video), between consumers or end users. Also, P2P networks and systems exist that allow end users to wirelessly communicate and transfer information between wireless devices within an ad-hoc network. However, like conventional information distribution systems, many P2P network distribution systems lack customization and selectability by the end users and the devices receiving the information with regard to the received information, including rights management associated with the distributed information. Licensing management models that have been proposed for addressing digital rights management issues for P2P networks and systems that transfer media content require receiving devices to acquire digital rights management from the one or few centralized sources, similar to non-P2P digital distribution methods and systems. Such models often encounter the same distribution issues as centralized or non-P2P digital distribution methods and systems.

DETAILED DESCRIPTION

Figure 1:
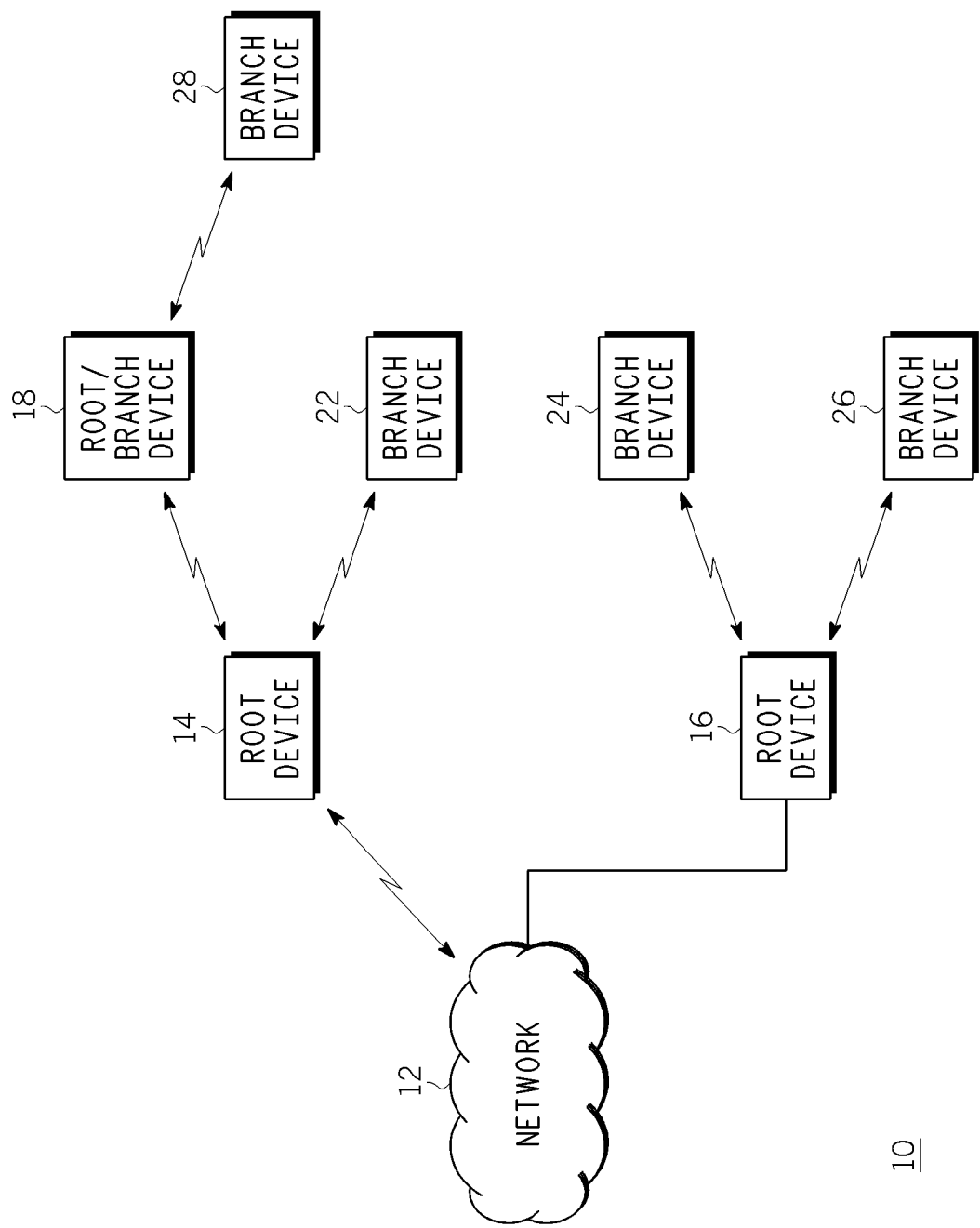
FIG. 1 is a block diagram of a system for distributing digital information including digital rights management information.

In the following description, like reference numerals indicate like components to enhance the understanding of the system, method and apparatus for distributing digital information including digital rights management information through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

Referring now to FIG. 1, shown is a block diagram of a system 10 for distributing digital information components including digital rights management (DRM) information. The system 10 includes a network 12, one or more root devices 14, 16, and one or more branch devices 22, 24, 26, 28. As will be discussed in greater detail hereinbelow, in the system 10, one or more of the devices, e.g., the device 18, can be both a root device and a branch device. The network 12 can be any suitable wired or wireless network system, such as the Internet or other suitable public network, any wired or wireless wide area network (WAN), local area network (LAN) or wireless local area network (WLAN), such as a residential network, or other suitable network or network system.

One or more of the root devices can be any suitable device that can connect, communicate and exchange information with the network 12 (or network device) and also connect, communicate and at least transmit or transfer information to one or more of the branch devices that comes into contact with the root device. The connection between the network and the root device can be a wired connection, as shown generally by the wired connection between the network 12 and the root device 16, or the connection can be wireless, as shown generally by the wireless connection between the network 12 and the root device 14. Although not shown, the network 12 typically includes one or more devices, such as routers or computers, for establishing a wired or wireless connection with one or more of the root devices.

One or more of the branch devices 18, 22, 24, 26, 28 can be any suitable device that can connect, communicate and at least receive information from one or more of the root devices with which the branch device comes into contact. Although the connection between the branch devices and the root devices are shown as wireless connections, it should be understood that one or more branch devices can be connected to one or more root devices via a wired connection.

The root devices and the branch devices can be the same or similar type of device. Moreover, one or more of the devices within the system 10 can serve or operate both as a root device and a branch device, even simultaneously. For example, as shown, the device 18 can be a branch device to the root device 14, but also can be a root device to the branch device 28. Suitable root devices and branch devices can include, but are not limited to, cellular telephones, smart telephones, personal digital assistants (PDAs), digital music players and other mobile devices. Other suitable root devices and branch devices can include desktop personal computers (PCs), laptop PCs, notebook PCs, digital cameras, wireless routers, and any suitable information processing devices, such as signal converter or decoder (set-top) boxes, residential gateways, and home media server systems.

Any one or more of the root devices and the branch devices can be partially or completely configured in the form of hardware circuitry and/or other hardware components within a larger device or group of components. Alternatively, any one or more of the root devices and the branch devices can be partially or completely configured in the form of software, e.g., as processing instructions and/or one or more sets of logic or computer code. In such configuration, the logic or processing instructions typically are stored in a data storage device (not shown), which typically is coupled to a processor or controller (not shown). The processor accesses the necessary instructions from the data storage device and executes the instructions or transfers the instructions to the appropriate location within the device.

Figure 2:
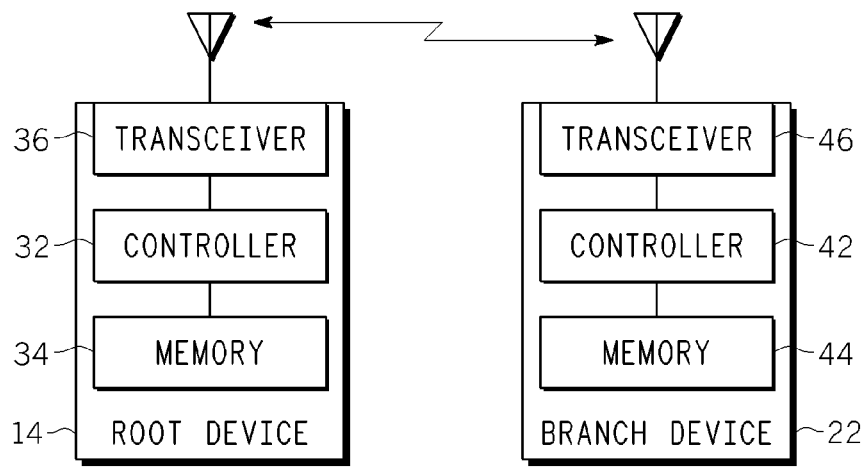
FIG. 2 is a block diagram of a root device and a branch device for distributing digital information including digital rights management information.

Referring now to FIG. 2, shown is a block diagram of a root device and a branch device for wirelessly distributing digital information components including digital rights management information. For purposes or discussion, the root device 14 and the branch device 22 are shown and will be described. However, it should be understood that the discussion of distributing digital information components between the root device 14 and the branch device 22 can apply to any one or more root devices and/or any one or more branch devices.

The root device 14 includes a controller 32 and a memory 34 coupled to the controller 32. The root device 14 also can include a transceiver 36, coupled to the controller 32, for wireless communication between the root device 14 and other devices. The controller 32 controls the operation of the root device 14, including the ability of the root device 14 to communicate with the branch device 22 and other devices, e.g., to receive digital information from information sources and to transmit digital information to other devices.

The memory 34 can be any suitable memory device, including random access memory (RAM), read-only memory (ROM) and Flash memory devices. In general, the memory 34 stores logic, processing instructions and other information and data for the controller 32 (and other device components) to access.

Typically, the root device 14 includes the transceiver 36, which is configured to allow the root device 14 to communicate wirelessly with the branch device 22, as well as with other devices and information sources (not shown). Alternatively, the root device 14 may not have a transceiver, and therefore may not be able to transmit and receive information wirelessly.

One or more of the controller 32, the memory 34 and the transceiver 36 can be comprised partially or completely of any suitable structure or arrangement, e.g., one or more integrated circuits. Also, it should be understood that the root device 14 includes other components, hardware and software (not shown) that are used for the operation of other features and functions of the root device 14 not specifically described herein.

The branch device 22 includes a controller 42 and a memory 44 coupled to the controller 32. The branch device 22 also can include a transceiver 46, coupled to the controller 42, for wireless communication between the branch device 22 and other devices. As with the controller 32 in the root device 14, the controller 42 in the branch device 22 controls the operation of the branch device 22, including the ability of the branch device 22 to communicate with the root device 14, e.g., to receive digital information from the root device 14.

The memory 44 can be any suitable memory device, including random access memory (RAM), read-only memory (ROM) and Flash memory devices. The memory 44 stores logic, processing instructions and other information and data for the controller 42 (and other device components) of the branch device 22 to access.

One or more of the controller 42, the memory 44 and the transceiver 46 can be comprised partially or completely of any suitable structure or arrangement, e.g., one or more integrated circuits. Also, it should be understood that the branch device 22 includes other components, hardware and software (not shown) that are used for the operation of other features and functions of the branch device 22 not specifically described herein.

As discussed hereinabove, many conventional systems and methods for distributing digital information to a plurality of devices typically have one or a few centralized distribution points to distribute the digital information. Such system arrangements can be relatively costly if information is distributed to a relatively large number of receiving devices. Moreover, such system arrangements often burden or strain network resources and/or other resources of information sources or service providers of the digital information. Also, such system arrangements do not lend themselves well to providing customized information distribution to the receiving devices, especially a relatively large number of receiving devices.

Alternative conventional systems and methods sometimes use a more distributed structure, such as a peer-to-peer (P2P) structure, to distribute digital information to a plurality of receiving devices. Typically, in general, with a P2P system structure, data distribution can be more efficient and more customized compared to centralized distribution systems. However, in P2P system arrangements, digital rights management of the distributed information remains an issue, especially when a consumer device receives digital information from another peer device rather than an owner or centralized vendor or service provider. As discussed hereinabove, conventional attempts to address digital rights management of distributed information in P2P systems involve obtaining licenses and other digital rights management information directly from the owner, vendor or service provider of the distributed information. In this manner, such methods are subject to the same issues associated with information distribution from centralized sources.

Figure 3:
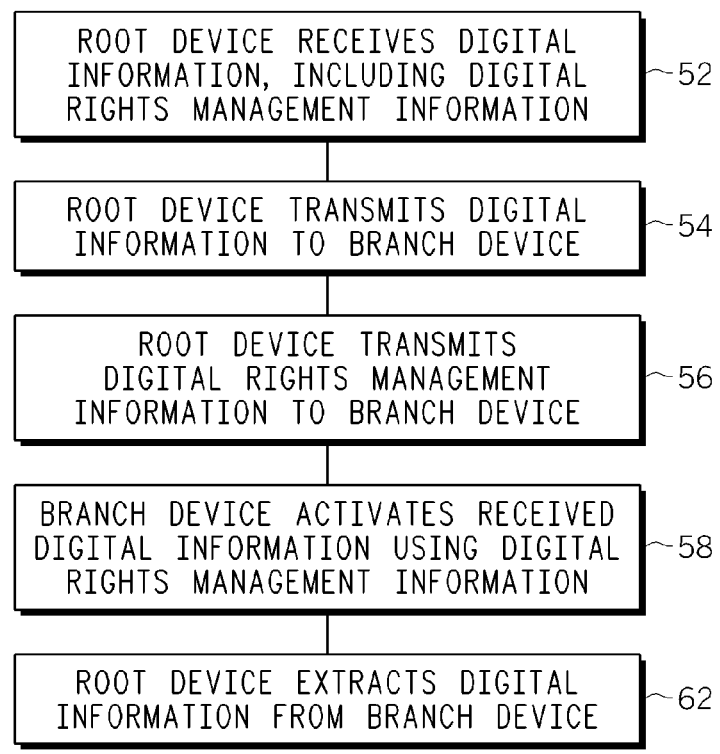
FIG. 3 is a flow chart that schematically illustrates a method for distributing digital information including digital rights management information.

Referring now to FIG. 3, with continuing reference to FIG. 1 and FIG. 2, shown is a flow chart that schematically illustrates a method 50 for wirelessly distributing digital information components including digital rights management information. The method 50 will be described along with the operation of the root devices, e.g., the root device 14, and the plurality of branch devices, e.g., the branch device 22.

The method 50 includes a step 52 of one or more root devices receiving digital information, including digital rights management information. Digital information includes download information, such as device software upgrades or patches, new features for devices or upgrades to existing features for devices, new interfaces for devices or upgrades for existing interfaces for devices. Digital information also includes activation information or digital rights management information. Activation or digital rights management information includes any suitable information that allows a device receiving the activation information and the download information to activate, install, execute or otherwise operate or make use of the download information. Activation information typically includes the description and ownership of the download information, the authentication and/or verification of devices authorized to receive the download information, and the necessary keys and/or other decryption information to activate the download information. Digital information also can include notices or alerts to the availability of download information and/or digital rights management information. As discussed hereinabove, in conventional information distribution methods, digital rights management information typically is obtained only from the owner, vendor or service provider (or their network), even in P2P distribution systems.

In the step 52, one or more of the root devices receives the digital information (i.e., download information and activation information) from the network 12 or other appropriate information source or service provider. For example, the digital information is encrypted with a domain key or other form of encryption and transmitted to one or a few root devices. The root device can download the digital information via a wired or wireless connection to a personal computer or other suitable component from an owner, vendor or service provider website. Alternatively, the digital information can be transferred to one or more root devices at an owner or vendor store or other location, e.g., via a wired or wireless connection. The root device can then decrypt the received digital information, e.g., as part of the process of receiving the digital information or after the root device has received the digital information.

The method 50 also includes a step 54 of a root device transmitting download information to one or more branch devices. For example, the root device 14 transmits download information to the branch device 22. As discussed hereinabove, the download information can be a software upgrade, a device feature, a device interface, or other suitable information. The transmission step 54 can transmit the download information to the branch device in any suitable manner, e.g., via a wired or wireless connection. Wireless connections can be performed using any suitable technology, including any suitable near field or near range technology, such as Bluetooth™, ZigBee, Ultra Wideband, Wireless USB, Z-wave, the Infrared Data Association (IrDA), nanoNET, any suitable technologies in accordance with the Wi-Fi standards, and any suitable technologies in accordance with the 802.11 family of standards.

The method 50 also includes a step 56 of a root device transmitting activation information or digital rights management information to one or more branch devices. As discussed hereinabove, activation or digital rights management information includes information that allows a device receiving the activation and the download information to activate, install, execute or otherwise use download information. The transmission step 54 can transmit the activation or digital rights management information to the branch device in any suitable manner, e.g., via a wired or wireless connection, such as in accordance with any one or more of the wireless technologies discussed previously herein.

As part of the step 54 and/or the step 56, a digital certificate or other authentication information can be transferred between the root device and the branch device, and/or between the network 12 and one or both of the root device and the branch device. The certificate can serve to note or verify the transfer of the feature or upgrade, as well as identify the particular root device and branch device involved in the transfer.

It should be understood that, although the transmission step 54 and the transmission step 56 are shown as separate steps, the step 54 of transmitting download information from a root device to a branch device and the step 56 of transmitting activation information from the root device to the branch device can be performed as a single transmission step from the root device to the branch device. As discussed hereinabove, digital information includes both download information and activation information. Moreover, it should be understood that the transmission step 54 and/or the transmission step 56 can include encrypting the information, e.g., before transmitting the information, and decrypting the information, e.g., after receipt of the information.

The method 50 also includes a step 58 in which the branch device uses the activation or digital rights management information received from the root device to activate the download information, e.g., the download information received from the root device. That is, the activation or digital rights management information allows the branch device to activate, install, execute or otherwise use the download information. For example, if the download information is a software upgrade, the activation information can allow the branch device to install the software upgrade. As discussed hereinabove, conventionally, activation or digital rights management information had to be obtained from the source of the download information, i.e., the software owner or vendor. However, the method 50 allows digital rights management information to be obtained from the same source as the download information, i.e., from the root device. In this manner, digital rights management information can be transmitted along with download information in a non-centralized, P2P system arrangement.

According to the method 50, one or both of the download information transmission step 54 and the activation information transmission step 56 can be conditional transmission steps. That is, one or both of the transmission steps 54 and 56 can be performed based on or in response to one or more conditions or events, i.e., if a certain condition exists or if a certain event occurs. Such events include, e.g., time-based conditions or events, location-based conditions or events, authentication-based conditions or events and intent or intent to distribute-based conditions or events.

For example, it is possible that one or both of the transmission steps 54 and 56 may not be performed except during a given time window, e.g., within 24 hours from a root device receiving digital information. Thus, the download information and the activation information might be available for the branch device to receive only for 24 hours from the time the root device obtained the digital information, e.g., from an information source. Similarly, the transmission steps 54 and 56 might only be performed if the root device and the branch device are within a given location, either in general or with respect to one another. With respect to authentication-based events and intent or intent to distribute-based events, the transmission steps 54 and 56 might only be performed if the branch device is a certain type of device approved for receiving the download information, e.g., if the branch device is the type of device to which the root device intends to distribute digital information.

It should be understood that other conditions can or may have to exist before one or both of the transmission steps 54 and 56 can be performed. For example, the branch device may be required to request download information from one or more root devices. Such request may be in addition to obtaining the activation information, which allows the branch device to use the download information. Thus, one or more of the transmission steps 54 and 56 steps may occur in response to a specific request by the branch device.

It should also be understood that the use of the download information by one or more branch devices may be conditioned. For example, once download information is installed on a branch device, the download information might only be able to be used by the branch device for a given amount of time before the download information is automatically disabled or becomes inoperable.

The method 50 may also include a step 62 of extracting digital information from one or more branch devices. That is, the step 62 includes one or more root devices (or other suitable devices) extracting or removing download information and/or activation information from one or more branch devices. Such may occur as part of a previously-imposed timed-based, location-based or other condition on the use of the digital information by the branch device. Moreover, it should be understood that the extracting step 62 can be a conditional extracting step that is based on or in response to the conclusion or completion of a previous condition, such as one or more of the conditions discussed hereinabove.

The method 50 allows digital information, including download information and digital rights management information, to be distributed to a plurality of branch devices from one or more root devices. Thus, the method 50 allows a P2P system structure, with rights management. As with other P2P arrangements, according to the method 50, branch devices can become root devices for other branch devices. Also, devices can be both root devices and branch devices. For example, as discussed previously herein, in FIG. 1, the device 18 can be a branch device when receiving digital information from the root device 14. However, the device 18 can, in turn, be a root device to the branch device 28 when transmitting digital information to the branch device 28.

The method 50 can provide for more efficient or effective distribution of information compared to many conventional information distribution methods and systems. For example, if a branch device is having trouble receiving all or a portion of information from a first root device, the branch device can use one or more other root devices to obtain the needed or requested download information and/or digital rights management information.

In general, as an example scenario of the method 50, a first consumer or end user with a mobile music player may notice that a second end user has the latest update of a music player user interface on their mobile music player. Rather than going to the store or calling the vendor/operator to obtain the interface update and the associated rights management information to install the update, the first end user asks the second end user to download the digital information directly to the first user's music player, e.g., in any suitable manner using an appropriate connection, e.g., a wireless connection using Bluetooth or other suitable wireless technology. The second end user agrees and allows the first end user to download the music player interface and associated rights management information. In this manner, the first end user obtains the upgrade and the rights to use the upgrade without burdening the resources of the owner or vendor of the interface (since the download was made peer to peer). Also, the end user does not have to visit the owner or vendor store or website.

As another example, download information and associated digital rights management information can be distributed from a root device to one or more branch devices that come within a given proximity of the root device. For example, a vendor may transmit download information and associated digital rights management information to a root device, with instructions that the root device automatically download the information to any other user (branch device) that comes into proximity of the root device. As discussed hereinabove, the ability to receive the information from the root device can be time-based, e.g., within the next 30 days, or priority-based, e.g., certain branch devices are certified to receive the information, while other branch devices are not certified to receive the information. Such certification information can be part of the activation information transmitted to the root device from the information source.

As another example, download information and associated digital rights management information can be location dependent. For example, a user interface application for watching instant replays can be made available within a sports stadium. Associated digital rights management, e.g., content rights management, also is made available within the stadium. Once an end user obtains the user interface application and its associated digital rights management information, the user interface application can be transferred peer-to-peer from the root device to branch devices throughout the stadium. Alternatively, the user interface application is extracted from a branch device once the branch device leaves the stadium.

The method shown in FIG. 3 described herein may be implemented in a general, multi-purpose or single purpose processor. Such a processor will execute instructions, either at the assembly, compiled or machine-level, to perform that process. Those instructions can be written by one of ordinary skill in the art following the description of the data traffic routing method described herein and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the system, method and apparatus for distributing digital information herein described without departing from the spirit and scope of the invention as defined by the appended claims and their full scope of equivalents.

The invention claimed is:

1. A method for distributing digital information among a plurality of peer devices, wherein the plurality of peer devices include a plurality of root devices authorized to distribute the digital information and at least one branch device, comprising the steps of:

receiving digital information by a root device, the digital information originating from an information source external to the plurality of peer devices, wherein the received digital information includes download information and digital rights management information, wherein the digital rights management information comprises decryption keys, and wherein the digital rights management information allows a device to activate received download information;

transmitting a first portion of the download information from the root device to the branch device;

transmitting a second portion of the download information from at least a second root device of the plurality of root devices to the branch device; and transmitting the digital rights management information from the root device to the branch device, wherein, upon receipt of the digital rights management information from the root device, the branch device can activate the received download information using the digital rights management information, conditionally removing one of the digital rights management information or the download information and the digital rights management information from the branch device based on the completion of at least one of a time-based condition, a location-based condition, an authentication-based condition, and an intent to distribute-based condition.

2. The method as recited in claim 1, wherein the digital rights management information transmitting step further comprises conditionally transmitting the digital rights management information based on at least one of an authentication-based condition and an intent to distribute-based condition.

3. The method as recited in claim 1, wherein the download information includes at least one of a device software upgrade, a device feature, a device feature upgrade, a device user interface and a device user interface upgrade.

4. The method as recited in claim 1, wherein at least one of the first portion transmitting step and the digital rights management information transmitting step are performed in response to a request for the digital information from the branch device to the root device.

5. The method as recited in claim 1, wherein at least one of the receiving step, the digital rights management information transmitting step, the first portion transmitting step, and the second portion transmitting step includes encrypting the digital information being transferred.

6. The method as recited in claim 1, wherein the first portion transmitting step and the digital rights management information transmitting step are performed as a single step of transmitting the digital information from the root device to the branch device.

7. The method as recited in claim 1, wherein at least one of the receiving step, the digital rights management information transmitting step, the first portion transmitting step, and the second portion transmitting step includes wirelessly transferring the digital information being transferred.

8. The method as recited in claim 1, wherein at least one of the receiving step, the first portion transmitting step and the digital rights management information transmitting step includes transferring a digital certificate between at least one of the information source, the root device and the branch device in such a way that verifies the transfer of information between the root device and the branch device and/or identifies at least one of the root device and the branch device.

9. A peer-to-peer system for distributing digital information, comprising:

a plurality of root devices;

at least one branch device configured to communicate with the plurality of root devices, wherein a root device is configured to receive digital information, the digital information originating from an information source external to the peer-to-peer system, wherein the received digital information includes download information and digital rights management information, wherein the digital rights management information comprises decryption keys, and wherein the digital rights management information allows a device to activate received download information, wherein the root device is configured to transmit a first portion of the download information to the branch device, wherein at least a second root device of the plurality of root devices is configured to transmit a second portion of the download information to the branch device;

wherein the root device is configured to transmit the digital rights management information to the branch device;

wherein the root device is configured to, upon receipt of the digital rights management information from the information source, activate the received download information using the digital rights management information, and wherein the branch device is configured to, upon receipt of the digital rights management information from the root device, activate the received download information using the digital rights management information, wherein the root device is configured to conditionally remove one of the digital rights management information or the download information and the digital rights management information from the branch device based on at least one of a time-based condition, a location-based condition, an authentication-based condition, and an intent to distribute-based condition.

10. The system as recited in claim 9, wherein the root device is configured to conditionally transmit one of the digital rights management information or the first portion of the download information and the digital rights management information to the branch device based on at least one of an authentication-based condition and an intent to distribute-based condition.

11. The system as recited in claim 9, wherein the branch device is configured to request digital information from the root device, and wherein the root device is configured to transmit digital information to the branch device in response to a request for the digital information from the branch device.

12. The system as recited in claim 9, wherein at least one of the root device, the second root device, and the branch device is configured to transmit and receive digital information wirelessly.

13. The system as recited in claim 9, wherein at least one of the root device, the second root device, and the branch device further comprises a device selected from the group consisting of a cellular telephone, a smart telephone, a personal digital assistant (PDA), a digital music player, a desktop personal computer (PC), a laptop PC, a notebook PC, a digital camera, and a router.

14. A device of a plurality of root devices for distributing digital upgrade information and digital rights management information corresponding to the digital upgrade information to at least one of a plurality of peer branch devices, wherein the digital rights management information allows a device to install and execute received digital upgrade information, the device comprising:
- a memory;
- a controller coupled to the memory; and
- a transceiver coupled to the controller,
  - wherein the controller is configured to receive, via the transceiver, the digital upgrade information and the digital rights management information, the digital upgrade information and the digital rights management information originating from an information source external to the plurality of root devices and the plurality of peer branch devices, wherein the digital rights management information comprises decryption keys,
  - wherein the controller is configured to transmit a first portion, via the transceiver, of the digital upgrade information to at least one of the plurality of peer branch devices, wherein a second portion of the digital upgrade information is received by the at least one of the plurality of peer branch devices from at least a second device of the plurality of root devices,
  - wherein the controller is configured to transmit, via the transceiver, the digital rights management information to the at least one of the plurality of peer branch devices,
  - wherein the peer branch device, upon receipt of the digital rights management information, is able to install and execute the received digital upgrade information,
  - wherein the controller is configured to conditionally remove one of the digital rights management information or the download information and the digital rights management information from the peer branch device based on at least one of a time-based condition, a location-based condition, an authentication-based condition, and an intent to distribute-based condition.

15. The device as recited in claim 14, wherein the device is configured to conditionally transmit the digital rights management information to the at least one of the plurality of peer branch devices in response to at least one of an authentication-based condition and an intent to distribute-based condition.

16. The device as recited in claim 14, wherein the controller is further configured to wirelessly receive, via the transceiver, the digital upgrade information and the digital rights management information from the information source, and configured to wirelessly transmit, via the transceiver, the first portion of the digital upgrade information and the digital rights management information to the at least one of the plurality of peer branch devices.

17. The device as recited in claim 14, wherein the digital upgrade information includes at least one of a branch device software upgrade, a branch device feature, a branch device feature upgrade, a branch device user interface and a branch device user interface upgrade.

* * * * *